United States Patent [19]

Liska

[11] 4,047,081
[45] Sept. 6, 1977

[54] COMMUTATING ARRANGEMENT FOR AN ELECTRIC MOTOR SUPPLIED FROM A DC VOLTAGE SOURCE

[75] Inventor: Manfred Liska, Nurnberg, Germany

[73] Assignee: Siemens Aktiengesellschaft, Munich, Germany

[21] Appl. No.: 660,848

[22] Filed: Feb. 24, 1976

[30] Foreign Application Priority Data

Feb. 27, 1975 Germany .................. 2508546

[51] Int. Cl.[2] ........................................ H02K 29/00
[52] U.S. Cl. ............................. 318/138; 318/696; 363/97; 363/132
[58] Field of Search .............. 318/138, 254, 696; 321/5, 21, 24, 45 R

[56] References Cited

U.S. PATENT DOCUMENTS

| | | | |
|---|---|---|---|
| 3,497,784 | 2/1970 | Toth et al. | 318/138 |
| 3,737,755 | 6/1973 | Calkin et al. | 321/21 |
| 3,916,272 | 10/1975 | Grunleitner et al. | 318/138 |
| 3,924,166 | 12/1975 | Doemen | 318/138 |

FOREIGN PATENT DOCUMENTS

1,487,014   7/1966   France ..................... 321/45 R

*Primary Examiner*—Gene Z. Rubinson
*Attorney, Agent, or Firm*—Kenyon & Kenyon, Reilly, Carr & Chapin

[57] ABSTRACT

A circuit for use with an electric motor being supplied by a DC voltage source is disclosed. More particularly, in accord with the invention, the circuit includes a main transistor which is adapted to be connected to the DC voltage source and which is connected to a commutating arrangement comprised of transistors arranged in a bridge circuit. Moreover, in further accord with the invention, the circuit is provided with a control device for supplying on-off commands to the transistors of the commutating arrangement and for controlling the main transistor such that it is provided with an off command of short duration at a time when one of the transistors of the commutating arrangement is being supplied with an on command.

5 Claims, 1 Drawing Figure

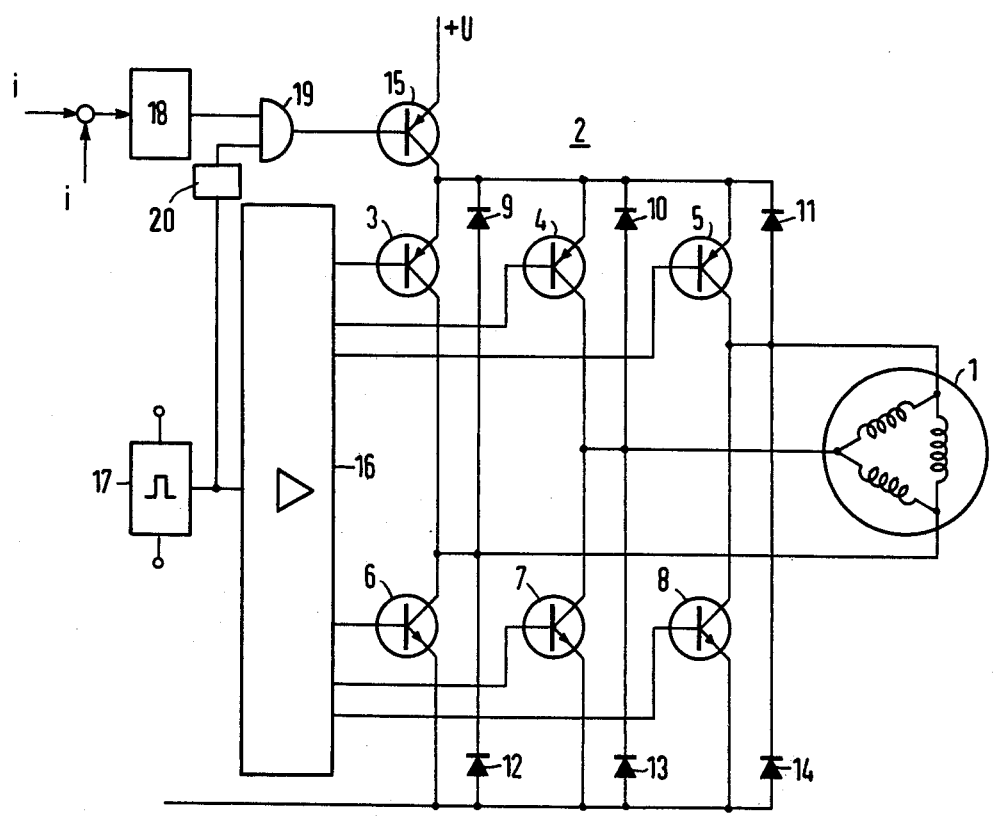

COMMUTATING ARRANGEMENT FOR AN ELECTRIC MOTOR SUPPLIED FROM A DC VOLTAGE SOURCE

BACKGROUND OF THE INVENTION

1. Field of the Invention

This invention relates to circuits for use with an electric motor supplied from a DC voltage source, and, in particular, to a circuit comprising a commutating arrangement having transistors which are provided by a control circuit with on-off commands in dependence on the motor rotor position.

2. Background of the Invention

A circuit of the above type is disclosed in the journal "Technische Rundschau", no. 2, Jan. 15, 1974, page 27. In the commutating arrangement of the circuit, commutation is accomplished by appropriately controlling the on-off states of the transistors in the two bridge halves. During each commutation, a transistor in one bridge half of a bridge branch is controlled to be off, while the transistor situated in the other bridge half of the same bridge branch is controlled to be on. Because of the finite switching times of the transistors, the transistors of a bridge branch are both on for a short duration of time during the commutation process. During this overlap of the switching times of the transistors the DC voltage source is short-circuited and the current in the circuit is thus limited only by the internal resistance of the source. This presents a considerable load for the source and also for the transistors which for a time must operate in the region of second breakdown. As a result, the life of the transistors is considerably shortened. Moreover, to provide interlocking between the transistors arranged in the same bridge branch to alleviate the above condition is too expensive as, in part, fixed potentials are not present.

It is, therefore an object of the present invention to provide a circuit including a commutating arrangement for an electric motor supplied from a DC voltage source which is designated to inhibit excessive loading of the DC voltage source and the transistors of the commutating arrangements.

SUMMARY OF THE INVENTION

In accordance with the principles of the present invention, the above and other objectives are accomplished in a circuit of the above-described type by providing a main transistor between the commutating arrangement of the circuit and the DC voltage source and by causing the control circuit of the circuit to deliver an off command of short duration to the main transistor when the control circuit delivers an on command to one of the transistors of the commutating arrangement. By cutting off the main transistor during the overlap of the switching times of the commutating arrangement transistors, the DC voltage source is briefly disconnected from the commutating arrangement so that the aforesaid transistors can commutate without current. The main transistor can also be used advantageously for controlling the motor.

By providing a stepping motor controlled by a pulse generator as the electric motor, the off commands for the main transistor can be derived from the aforesaid pulse generator. This eliminates the need for separate decoupling elements, which may be required for deriving the control signals from the control circuit. In particular, by providing a delay stage between the pulse generator and the base of the main transistor, the length of the control signals for the main transistor can be varied in accordance with the requirements for the control of such transistor.

The main transistor can also be controlled by a regulator and a clock pulse generator in a simple manner by feeding the output signal of a control serving to switch the main transistor and the output signal of the clock pulse generator to the main transistor via AND logic, the latter being designed so that it delivers a signal to the main transistor only if no output signal of the clock pulse generator is present.

BRIEF DESCRIPTION OF THE DRAWINGS

The above and other features and aspects of the present invention will become more apparent upon reading the following detailed description in conjunction with the accompanying drawings, in which:

FIG. 1 shows a circuit in accordance with the principles of the present invention.

DETAILED DESCRIPTION

In FIG. 1, the motor 1 comprises three delta connected stator windings which are connected to a circuit 2. The circuit 2 comprises a commutating arrangement which includes a plurality of transistors 3 to 8 which are arranged in a bridge circuit. The transistors 3 to 5 form one-half of the bridge circuit and the transistors 6 to 8 the other half of the bridge circuit. Diodes 9 to 14 are connected antiparallel to transistors 3 to 8, respectively. The circuit 2 is further provided with a main transistor 15 which connects the input of the commutation arrangement to the plus pole of a DC voltage source U. The other end or minus pole of the source U, in turn, is coupled to the other input of the commutating arrangement.

A control circuit 16 which is also provided in the circuit 2, generates on-off command signals which are coupled to the bases of the transistors 3 to 8. The control circuit 16 operates in dependence on the rotor position of motor 1 and is fed signals from rotor position transmitters which have not been shown in the drawing in the interest of clarity. The transistors 3 to 8 are, thus, controlled or commanded to turn on and off via the control circuit 16 in an order corresponding to the rotor position.

In the illustrative embodiment shown, the circuit 2 also comprises a clock generator 17 which feeds the control circuit 16. The clock generator 17 delivers pulses to the circuit 16 such that the circuit provides step-wise control of the motor 1. These pulses, together with the control pulses transmitted by a regulator 18, are also fed via an AND logic gate 19 to the main transistor 15. Additionally, a delay stage 20 is arranged between the AND gate 19 and the clock generator 17, so as to be able to control the pulses being delivered by clock 17 to a desired length.

The circuit 2 operates as follows. Let it be assumed that the transistor 3 in the first half of the bridge circuit and the transistors 7 and 8 in the second half of the bridge circuit are in conduction. In the next commutation step, the control circuit 16 causes the transistor 4 in the first bridge half, and the transistor 6 in the second bridge half to conduct and at the same time cuts off the transistor 3 in the first bridge half and the transistor 7 in the second bridge half. Becuase of the finite switching times of the transistors, the transistors 3 and 6 in a first bridge branch and the transistors 4 and 7 in a second bridge branch are all conducting during the initial period of the commutation step. Thus, an excessively large current would normally flow through the respective transistors during this period of overlap of their switching times. Moreover, if this were allowed to occur, it, together with the transistor voltage would cause the operating point of the transistors to lie for a short time in the region of second breakdown. In accord with the invention, the above condition is prevented by controlling the main transistor 15 so that it becomes cut off at the beginning of a commutation step. This permits the transistors to commutate without current.

In the present embodiment, the main transistor 15 is controlled in dependence on pulses being delivered by the clock generator 17. As these pulses also control the commutation of the transistors 3 to 8, synchronous control of the main transistor 15 and the corresponding transistors 3 to 8 is provided. The rising flanks of the pulses being delivered by the clock generator 17 are preferably used for controlling the main transistor 15, while the falling flanks are used to control the transistors 3 to 8. As a result, the main transistor 15 is cut off prior to the transistors 3 to 8 being driven from one state to another.

The AND gate 19 also makes it possible to control the main transistor 15 with the pulses from the clock generator 17 as well as those from the regulator 18. In such case, the AND gate is designed such that it delivers a signal for causing the main transistor 15 to conduct only if a pulse from the clock generator 17 is not present.

In the circuit 2, the main transistor 15 can thus fulfill a double function. On the one hand, it can be used to block the current during one commutation step, so that the transistors 3 to 8 can commutate without current. On the other hand, it can also be used for controlling the motor 1. For the latter purpose, the main transistor 15 is controlled by the regulator 18 which may be, for example, a speed control or a current control. The corresponding reference and actual signal values are fed to the regulator 18, as shown.

What is claimed is:
1. A circuit for use with an electric motor supplied from a DC voltage source comprising:
   a commutating arrangement including transistors arranged in a bridge circuit;
   a main transistor connected to said commutating arrangement and adapted to be connected to said source;
   a first control means adapted to be responsive to the rotor position of said motor providing on-off commands for controlling said transistors of said commutating arrangement;
   a second control means for providing on-off commands to said main transistor, said second control means feeding an off command of short duration to said main transistor when said control circuit delivers an on command to one of said transistors of said commutating arrangement.

2. A circuit in accordance with claim 1 in which said main transistor serves as a control for said motor.

3. A circuit in accordance with claim 1 in which said motor is a stepping motor and said second control means includes a clock generator whose output is used to develop the on-off commands for said main transistor and which is adapted to provide control for said motor.

4. A circuit in accordance with claim 1 in which said second circuit means further includes a delay stage arranged between said clock generator and said main transistor.

5. A circuit in accordance with claim 3 in which said second circuit means further includes:
   a regulator;
   and an AND gate responsive to the output of said regulator and to the output of said clock generator for supplying an output signal to said main transistor, said AND gate being configured such that it supplies said output signal to said main transistor only when there is no output from said clock generator.

* * * * *